UNITED STATES PATENT OFFICE.

MARTIN CONNELLY, OF PHILADELPHIA, PENNSYLVANIA.

VARNISH.

SPECIFICATION forming part of Letters Patent No. 249,902, dated November 22, 1881.

Application filed December 16, 1880. (Specimens.)

*To all whom it may concern:*

Be it known that I, MARTIN CONNELLY, a citizen of the United States, residing at Philadelphia, in the county of Philadelphia and State of Pennsylvania, have invented certain new and useful Improvements in Varnishes; and I do hereby declare the following to be a full, clear, and exact description of the invention, such as will enable others skilled in the art to which it appertains to make and use the same.

This invention relates to a new composition of materials to be used as a varnish in the manufacture of paints and of inks for printers, engravers, &c.

It consists in employing a peculiar product of petroleum as a substitute for the oils (such as linseed-oil, rosin-oil, or cotton-seed oil) ordinarily employed in the manufacture of varnishes. This product is obtained by boiling for three hours crude petroleum and lime together, at a temperature of about 350° Fahrenheit, in the proportion of about eighteen hundred parts, by weight, of the former to twenty-seven parts of the latter, which results in completely deodorizing the crude petroleum and in removing by evaporation and neutralization all of the materials that are detrimental to paints, inks, &c. The lime is withdrawn from the oil before the oil is removed from the vessel, and therefore no calcined products are left therein, as is done by the ordinary processes. The product thus obtained I have found to be much superior to any of the oils commonly used in making varnishes, as the varnish containing it is not affected by climatic conditions, but has a reliable and uniform drying capacity under all ordinary circumstances. Moreover, as the purifying and deodorizing of the oil is effected without the use of acids or water, the varnish can be used without injury to metallic surfaces with which the varnish comes in contact. The varnish is especially valuable in printers' inks, as it does not injure the rollers, and can be readily removed therefrom by washing.

In making my varnish for most of the ordinary purposes I prefer to mix the above-described product of crude petroleum and rosin together in the proportion, substantially, of two parts of the former to one of the latter. To this mixture may be added any of the many materials used for various purposes in the manufacture of paints and inks, though the varnish itself, in the state herein described, (if carefully prepared,) can be used for any of the ordinary purposes to which varnish is applied by painters, cabinet-makers, oil-cloth manufacturers, &c.

I do not confine myself to the exact proportion herein named, for it is necessary to change the proportions of the ingredients for different circumstances, as is well known.

I am aware that in manufacturing varnishes use has been made of the common mineral lubricating-oils, such use being mentioned in the Patent No. 65,973, to Weissberger, June 18, 1865, these mineral lubricating-oils being, in some cases, the oils in the state in which they are taken from the ground, and in other cases being the heavier residuums obtained in the process of fractional distillation. The product of petroleum which I obtain is different from those last described, as, on the one hand, the dangerous and offensive ingredients found in the oil as it is obtained from the ground are removed, and, on the other hand, the heavier ingredients are still allowed to be mingled with and affected by the lighter ingredients of the crude oil after the latter have been rendered harmless by my peculiar process. Therefore I am enabled with it to make a varnish which shall not only be perfectly odorless and inoffensive, but shall at the same time be sufficiently volatile to dry readily.

I am also aware that in manufacturing varnishes use has been made of refined petroleum—that is, petroleum which has been subjected to a treatment with acids, followed by a treatment with alkalies, and then subjected to a washing with water, in order to remove the acids or alkalies in excess; but the introduction of either the acids or water is disastrous for many purposes, as these substances ruin the metallic parts with which they may come in contact, and, moreover, greatly interfere with the proper drying action of the oil.

I do not herein claim, broadly, either the deodorized product of petroleum which I use in the manufacture of the varnish or the process of obtaining the same, as they are made the subject-matter of another patent granted to me April 12, 1881, No. 240,094; nor do I herein claim the composition formed of the herein-described varnish, lamp-black, and gum-dammar, as I have made this composition the subject-matter of another patent, dated December 31, 1880, No. 235,670. As the oil named in the following claim is fully described in said patent, and is claimed therein, reference can be had thereto for a description of it. It can be readily distinguished from the other oils on the market that are produced by the now known processes. It is of a dark-brown color, tinged with green and bronze, and is without the odors which have characterized the products heretofore obtained from petroleum.

What I claim is—

As an improved composition for the manufacture of varnish, the herein-described deodorized anhydrous rapidly-drying product of petroleum and rosin, mixed together in proportions substantially such as set forth.

In testimony whereof I affix my signature in presence of two witnesses.

MARTIN CONNELLY.

Witnesses:
HARRY E. KAUFMANN,
HARRY TORCHIANA, Jr.